(12) United States Patent
Yamamuro et al.

(10) Patent No.: US 11,079,246 B2
(45) Date of Patent: Aug. 3, 2021

(54) MANAGEMENT SYSTEM AND CONTROL SYSTEM

(71) Applicants: Toyota Jidosha Kabushiki Kaisha, Toyota (JP); Denso Corporation, Kariya (JP)

(72) Inventors: Naoki Yamamuro, Nagoya (JP); Shinichi Adachi, Kariya (JP); Ryo Hattori, Kariya (JP); Taichi Amakasu, Toyota (JP); Keigo Hiruma, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 265 days.

(21) Appl. No.: 16/256,559

(22) Filed: Jan. 24, 2019

(65) Prior Publication Data

US 2019/0226857 A1 Jul. 25, 2019

(30) Foreign Application Priority Data

Jan. 24, 2018 (JP) .............................. JP2018-009532

(51) Int. Cl.
*G01C 21/34* (2006.01)
*B61L 29/24* (2006.01)
(Continued)

(52) U.S. Cl.
CPC .......... *G01C 21/3453* (2013.01); *B60F 1/043* (2013.01); *B61L 27/0038* (2013.01); *B61L 27/0077* (2013.01); *B61L 29/24* (2013.01); *G01C 21/3415* (2013.01); *G08G 1/123* (2013.01)

(58) Field of Classification Search
CPC . G01C 21/3453; G01C 21/3415; B60F 1/043; B61L 27/0038; B61L 27/0077; B61L 29/24; G08G 1/123
See application file for complete search history.

(56) References Cited

U.S. PATENT DOCUMENTS 5,186,109 A * 2/1993 Madison ................. B60F 1/005
105/215.2
6,154,735 A * 11/2000 Crone ................. B61L 27/0022
706/45
(Continued)

FOREIGN PATENT DOCUMENTS

JP 2012-245808 A 12/2012

*Primary Examiner* — Hussein Elchanti
(74) *Attorney, Agent, or Firm* — Dinsmore & Shohl LLP (57) ABSTRACT

A management system according to the present disclosure is a management system that manages a travel plan of a vehicle that is capable of traveling on a road and a railway track, and includes controller that creates the travel plan of the vehicle. In a case where there is a route candidate track that is a railway track that is possibly used as a travel route of the vehicle, the controller acquires a railway operation schedule for the route candidate track, and determines whether the route candidate track can be used as the travel route of the vehicle, based on the operation schedule. In the case where the route candidate track can be used as the travel route of the vehicle, the controller creates a travel plan according to which the vehicle travels along the travel route including the route candidate track.

8 Claims, 8 Drawing Sheets

(51) Int. Cl.
*G08G 1/123* (2006.01)
*B61L 27/00* (2006.01)
*B60F 1/04* (2006.01)

(56) References Cited

U.S. PATENT DOCUMENTS

| | | | |
|---|---|---|---|
| 7,340,328 B2 * | 3/2008 | Matheson | B61L 27/0016 701/19 |
| 8,589,057 B2 * | 11/2013 | Kickbusch | B61L 27/0027 701/117 |
| 2013/0068126 A1 * | 3/2013 | Moon | B61F 5/38 105/157.1 |
| 2015/0020707 A1 * | 1/2015 | Zeng | B60F 1/00 104/2 |
| 2018/0244292 A1 * | 8/2018 | Bailey | B61L 23/14 |
| 2018/0251142 A1 * | 9/2018 | Wait | G06Q 10/20 |
| 2019/0228358 A1 * | 7/2019 | Ootsuka | G06Q 10/06312 |
| 2019/0351919 A1 * | 11/2019 | Hagiwara | B61L 3/125 |
| 2020/0086901 A1 * | 3/2020 | Kojima | B61L 23/34 |

\* cited by examiner

MANAGEMENT SYSTEM AND CONTROL SYSTEM

This application claims the benefit of Japanese Patent Application No. 2018-009532, filed on Jan. 24, 2018, which is hereby incorporated by reference herein in its entirety.

BACKGROUND

Technical Field

The present disclosure relates to a management system that manages a travel plan of a vehicle, and a control system that controls a vehicle that is a management target of the management system.

Description of the Related Art

To achieve seamlessness between road traffic and railroad, there is proposed a vehicle that is capable of traveling not only on roads, but also on railway tracks (for example, see Patent document 1).

Citation List

Patent Document

[Patent document 1] Japanese Patent Laid-Open No. 2012-245808

SUMMARY

In the case of causing a vehicle to travel using a railway track, the vehicle has to be prevented from becoming an obstacle to operation of a train that is operated on the railway track. The present disclosure has been made in view of such circumstances, and has its object to provide a technique for effectively using a railway track as a travel route of a vehicle.

A management system according to a first aspect of the present disclosure is a management system that manages a travel plan of a vehicle that is capable of traveling on a road and a railway track, the management system may including a controller comprising at least one processor configured to create the travel plan of the vehicle, where the controller
determines, based on map data including a current position of the vehicle and a destination of the vehicle, whether there is a route candidate track that is a railway track that is possibly used as a travel route of the vehicle,
acquires a railway operation schedule for the route candidate track, in a case where presence of the route candidate track is determined, and
determines whether the route candidate track can be used as the travel route of the vehicle, based on the railway operation schedule for the route candidate track acquired, and
in a case where the route candidate track may be determined as usable as the travel route of the vehicle, a travel plan is created such that the vehicle travels along the travel route including the route candidate track.

The management system according to the present aspect takes a vehicle that is capable of traveling on a read and a railway track as a management target, and includes the controller that creates a travel plan of the vehicle based on the map data including the current position of the vehicle and the destination of the vehicle. The travel plan may include a travel route of the vehicle, and a travel schedule for the vehicle for traveling along the travel route.

The controller may determine whether there is a route candidate track in the map data including the current position of the vehicle and the destination of the vehicle. The route candidate track here is a railway track where the vehicle can travel on when the vehicle is to reach the destination from the current position. The controller may acquire a railway operation schedule for the route candidate track. Normally, trains travel on a railway track according to a railway operation plan (operation diagram). However, in actual operation, a deviation from the operation plan (delay or suspension with respect to the operation plan) may be caused due to an accident or weather, for example. Accordingly, the controller may acquire a railway operation plan, and a railway operation schedule for the route candidate track which takes the deviation from the operation plan into account.

The controller may determine whether the route candidate track is usable as the travel route of the vehicle, based on the railway operation schedule for the route candidate track acquired by the operation schedule acquisition unit. That is, the controller may determine whether, if the vehicle traveled on the route candidate track, the vehicle would obstruct operation of a train which is operated on the route candidate track. In the case where the route candidate track is determined as usable as the travel route of the vehicle, that is, in the case where it is determined that the vehicle would not obstruct operation of a train even if the vehicle traveled on the route candidate track, the controller may create a travel plan according to which the vehicle travels along the travel route including the route candidate track.

As described above, a travel plan is created according to which the vehicle travels along a travel route including a railway track, in a case where the vehicle is able to travel on the railway track without obstructing operation of a train. Accordingly, a railway track may be effectively used as the travel route of the vehicle.

In the case where the vehicle according to the present aspect is a vehicle which is used for public transport or a rideshare vehicle, it is conceivable that, when the vehicle travels on the railway track, railway users use the vehicle as a transport, instead of a train which is operated on the railway track. Accordingly, the management system according to the present aspect may further include distributor that distributes, over a network, a travel schedule of the vehicle on the railway track that is made the route candidate track, in a case where the vehicle is to travel along the travel route including the route candidate track according to the travel plan created by the controller. This allows railway users to grasp the travel schedule of the vehicle distributed by the distributor. As a result, railway users are enabled to use, instead of a train, the vehicle traveling on the railway track as a transport.

A control system according to a second aspect of the present disclosure is a control system that controls a vehicle that is a management target of the management system according to the first aspect, and may include travel controller that causes the vehicle to perform autonomous traveling according to the travel plan of the vehicle created by the controller. A railway track may thereby be effectively used as a travel route of a vehicle that is capable of autonomous traveling.

A control system according to a third aspect of the present disclosure is a control system that may control a vehicle that is a management target of the management system according to the first aspect, and may include mode controller that places a control mode of a predetermined device in a road travel mode, when the vehicle is to travel on a road, and in a track travel mode, when the vehicle is to travel on a railway track, where the predetermined device is provided in the vehicle and is used to control a traveling state of the vehicle. Details of control for appropriately controlling the traveling state of the vehicle are different between when the vehicle travels on a road and when the vehicle travels on a railway track. Accordingly, by switching the control mode of the predetermined device that is used to control the traveling state of the vehicle between the road travel mode and the track travel mode, the traveling state of the vehicle may be more appropriately controlled.

In the control system according to the present aspect, the predetermined device may be a vibration damping mechanism that damps vibration of the vehicle. In this case, the mode controller may be damping controller that performs vibration damping control by controlling the vibration damping mechanism. A control cycle of the vibration damping control may be different between the road travel mode and the track travel mode. Additionally, as the vibration damping mechanism, a damper (shock absorber) attached to a suspension of the vehicle, an air spring attached to a suspension of the vehicle, a stabilizer installed between left and right wheels of the vehicle, and the like may be cited.

For example, a state of a surface where the wheels of the vehicle come into contact is different between a road and a railway track. That is, generally, the surface of a railway track is flatter than a surface of a road. Accordingly, in the case where the vehicle travels on a railway track, the damping properties of the vehicle are considered to be maintained at an appropriate level even if the control cycle of the vibration damping control is made longer than when the vehicle travels on a road. Accordingly, in the track travel mode, the control cycle of the vibration damping control may be made longer than in the road travel mode. The vibration damping mechanise may thereby be prevented from being unnecessarily operated.

The control system according to the present aspect may further include travel controller that performs collision avoidance control for avoiding collision between the vehicle and an object, based on a sensing result of a sensor that performs sensing with respect to a surrounding state of the vehicle. In this case, the predetermined device may be the sensor, and the mode controller may be sensor controller that controls the sensor. A sensing level of the sensor may be different between the road travel mode and the track travel mode. Additionally, the sensor here is a device including a camera, a radar and the like, and is a device that detects an object (including people and animals), such as another vehicle, present in the surroundings of the vehicle.

For example, in the case where a vehicle travels on a road, an object such as a person or another vehicle may run into the road where the vehicle is traveling. Accordingly, for the travel controller to appropriately perform the collision avoidance control at the time of the vehicle traveling on a road, the sensor has to perform sensing with respect to a surrounding state of the vehicle in not only a front-back direction of the vehicle, but also in a transverse direction of the vehicle. On the other hand, when the vehicle is traveling on a railway track, the possibility of an object running in from the transverse direction of the vehicle is low compared to a case where the vehicle is traveling on a road. Accordingly, in the case where the vehicle travels on a railway track, it is assumed that the collision avoidance control can be appropriately performed even if the sensing level of the sensor for the transverse direction of the vehicle is reduced compared to a case where the vehicle travels on a road. Accordingly, the sensing level of the sensor for the transverse direction of the vehicle may be reduced in the track travel mode compared to the road travel mode. The sensor may thereby be prevented from performing unnecessary sensing.

A management method according to a fourth aspect of the present disclosure is a management method of managing a travel plan of a vehicle that is capable of traveling on a road and a railway track, the management method may including the steps of:

determining, based on map data including a current position of the vehicle and a destination of the vehicle, whether there is a route candidate track that is a railway track that is possibly used as a travel route of the vehicle;

acquiring a railway operation schedule for the route candidate track, in a case where presence of the route candidate track is determined;

determining whether the route candidate track is usable as the travel route of the vehicle, based on the railway operation schedule for the route candidate track; and creating a travel plan according to which the vehicle travels along the travel route of the vehicle including the route candidate track, in a case where the route candidate track is determined as usable as the travel route of the vehicle.

A program according to a fifth aspect of the present disclosure is a program for causing a computer to perform a management method of managing a travel plan of a vehicle that is capable of traveling on a road and a railway track, the management method may including the steps of:

determining, based on map data including a current position of the vehicle and a destination of the vehicle, whether there is a route candidate track that is a railway track that is possibly used as a travel route of the vehicle;

acquiring a railway operation schedule for the route candidate track, in a case where presence of the route candidate track is determined;

determining whether the route candidate track is usable as the travel route of the vehicle, based on the railway operation schedule for the route candidate track; and creating a travel plan according to which the vehicle travels along the travel route of the vehicle including the route candidate track, in a case where the route candidate track is determined as usable as the travel route of the vehicle.

According to the present disclosure, a railway track may be effectively used as a travel route of a vehicle.

DESCRIPTION OF THE EMBODIMENTS

Hereinafter, a specific embodiment of the present disclosure will be described with reference to the drawings. Dimensions, materials, shapes, relative positions and the like of structural components described in the present embodiment are not intended to limit the technical scope of the disclosure, unless particularly specified.

Embodiment (System Overview)

Figure 1:
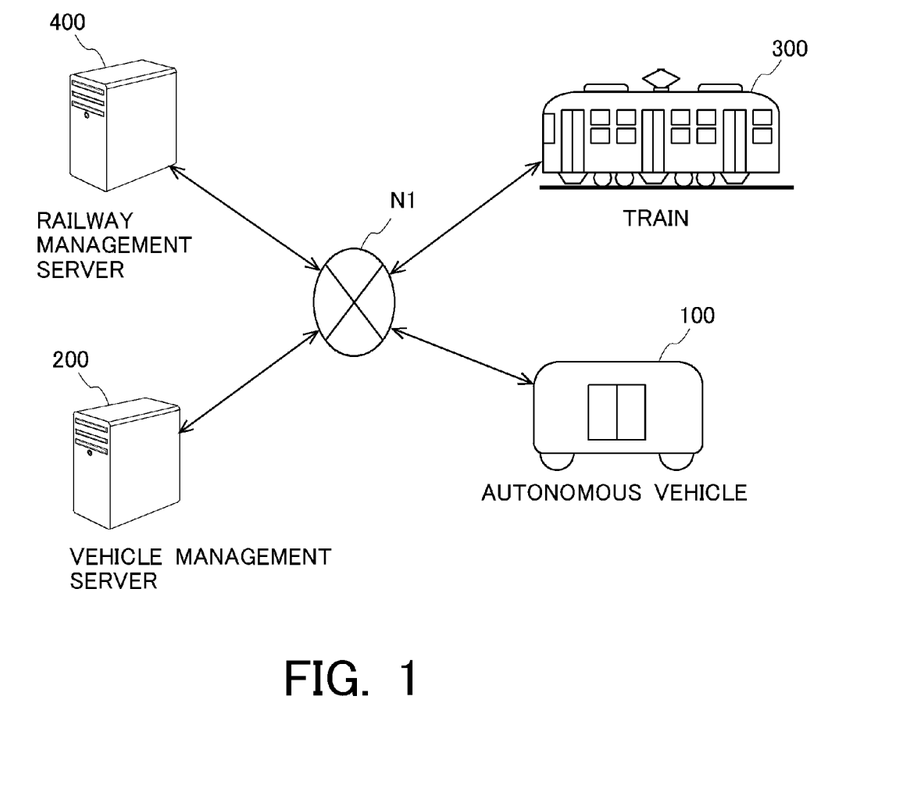
FIG. 1 is a diagram illustrating a schematic configuration of a system including a network to which a vehicle and a vehicle management server are connected.

In the present embodiment, a description is given of a case where a management, system according to the present disclosure is applied to a system for managing a travel route of a vehicle which is capable of traveling on a road and a railway track and which is capable of autonomous traveling. FIG. 1 is a diagram illustrating a schematic configuration of a system including a network to which the vehicle and a vehicle management server are connected.

In the present system, an autonomous vehicle 100 (hereinafter also referred to simply as "vehicle 100") and a vehicle management server 200 are connected to each other by a network N1 such as the Internet, which is a public telecommunication network. The vehicle 100 includes road traveling wheels and track traveling wheels, and is a vehicle which is capable of traveling not only on a road, but also on a railway track.

Figure 2:
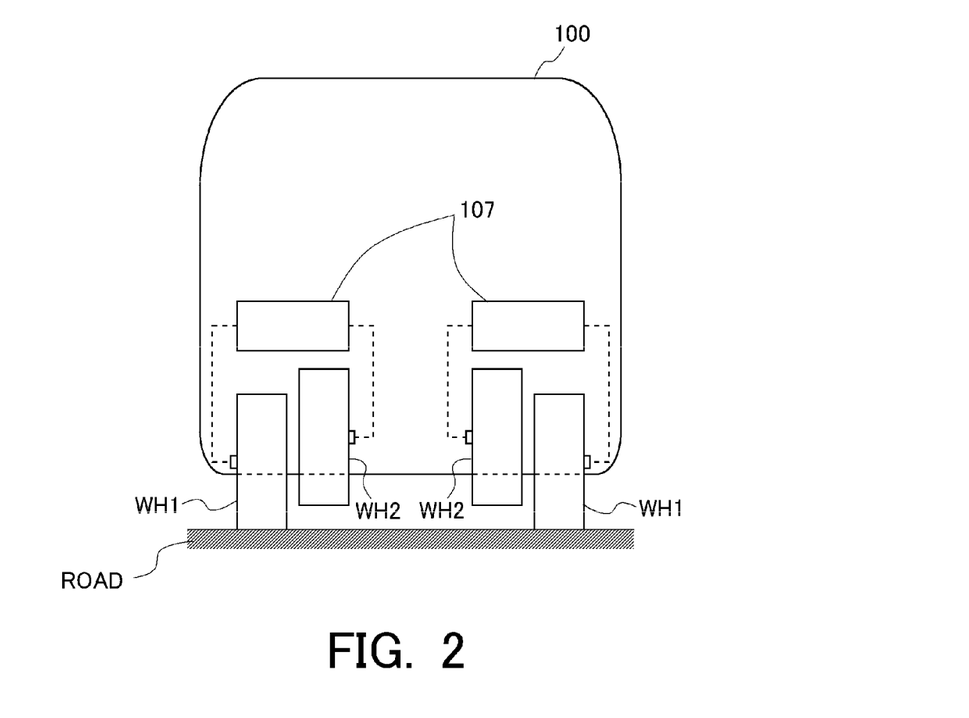
FIG. 2 is a diagram illustrating a state of each wheel in a road travel mode in which the vehicle travels on a road.
Figure 3:
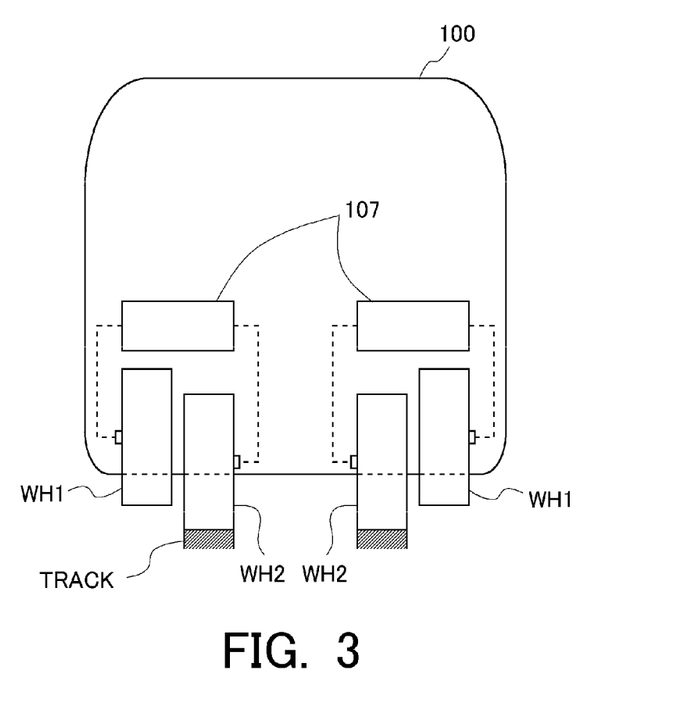
FIG. 3 is a diagram illustrating a state of each wheel in a track travel mode in which the vehicle travels on a railway track.

FIGS. 2 and 3 are diagrams illustrating states of each wheel of the vehicle 100 when the vehicle 100 is traveling on a road and when the vehicle 100 is traveling on a railway track. FIG. 2 is a diagram illustrating a state of each wheel in a road travel mode in which the vehicle 100 travels on a road. FIG. 3 is a diagram illustrating a state of each wheel in a track travel mode in which the vehicle 100 travels on a railway track. In FIGS. 2 and 3, WH1 indicates road traveling wheels, and WH2 indicates track traveling wheels. As illustrated in FIG. 2, in the road travel mode, the road traveling wheels WH1 are brought into contact with a road, and the track traveling wheels WH2 are drawn up so as not to be in contact with the road. Accordingly, in the road travel mode, the vehicle 100 is enabled to travel on a road by the road traveling wheels WH1. On the other hand, as illustrated in FIG. 3, in the track travel mode, the road traveling wheels WH1 are drawn up, and the track traveling wheels WH2 are brought into contact with a railway track. Accordingly, in the track travel mode, the vehicle 100 is enabled to travel on a track by the track traveling wheels WH2. Switching of wheels to be used (hereinafter, wheels used in a travel mode may be referred to as "in-use wheels") which is performed at the time of switching from one of the road travel mode and the track travel mode to the other travel mode is performed at the vehicle 100 by wheel switching actuators 107.

The vehicle management server 200 is a server that manages a travel plan of the vehicle 100. The vehicle management server 200 creates a travel plan of the vehicle 100 including a travel route, and transmits the created travel plan to the vehicle 100 through the network N1. The travel plan includes a travel route of the vehicle 100, and data regarding a travel schedule (time schedule) of the vehicle 100 for traveling along the travel route. The vehicle 100 performs autonomous traveling according to the travel plan which is transmitted from the vehicle management server 200.

A plurality of trains 300 which are operated on a railway track, and a railway management server 400 that manages operation of each train 300 are connected to the network N1. The railway management server 400 transmits an operation schedule of each train 300 to each train 300 through the network N1. Each train 300 travels on the railway track based on the operation schedule which is transmitted from the railway management server 400.

(Configurations of Autonomous Vehicle and Vehicle Management Server)

Figure 4:
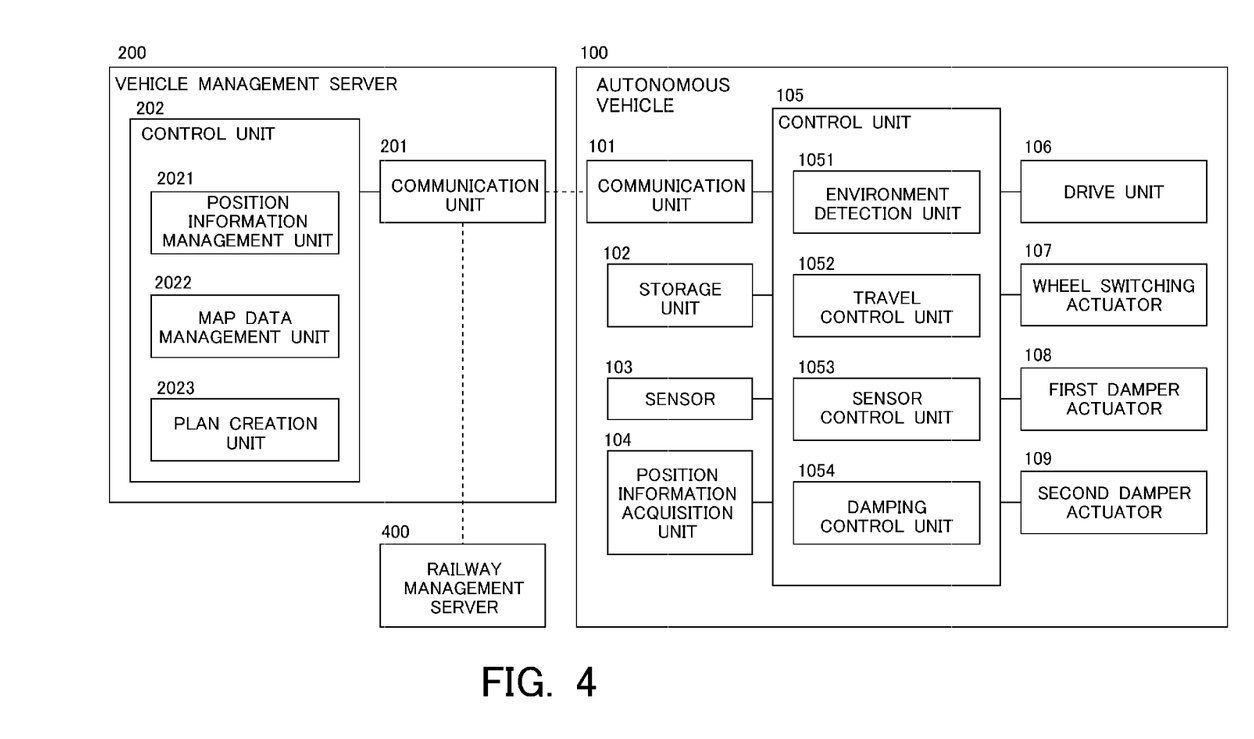
FIG. 4 is a block diagram schematically illustrating example configurations of an autonomous vehicle and the vehicle management server.

Next, configurations of the autonomous vehicle and the vehicle management server will be described with reference to FIG. 4. FIG. 4 is a block diagram schematically illustrating example configurations of the autonomous vehicle and the vehicle management server according to the present embodiment.

As described above, the vehicle 100 is an autonomous vehicle that performs autonomous traveling according to a travel plan which is transmitted from the vehicle management server 200. The vehicle 100 includes a communication unit 101, a storage unit 102, a sensor 103, a position information acquisition unit 104, a control unit 105, a drive unit 106, wheel switching actuators 107, first damper actuators 108, and second damper actuators 109. The vehicle 100 is an electric vehicle that uses a motor (not illustrated) as an engine. However, the engine of the vehicle 100 is not limited to an electric motor, and may be an internal-combustion engine instead. Alternatively, the vehicle 100 may be a hybrid vehicle including both a motor and an internal-combustion engine as the engines.

The communication unit 101 connects the vehicle 100 to the network N1. In the present embodiment, communication with other devices such as the vehicle management server 200 may be performed through the network N1 by using a mobile communication service such as 3G or LTE. The vehicle 100 transmits position information of itself to the vehicle management server 200 through the communication unit 101 every predetermined period. As described later, the vehicle 100 receives, through the communication unit 101, a travel plan of the vehicle 100 created by the vehicle management server 200. The communication unit 101 may further include communication units for performing inter-vehicle communication with other vehicles. The storage unit 102 stores information, and is configured of a storage medium such as a magnetic disk or a flash memory. For example, map information is stored in the storage unit 102. The travel plan of the vehicle 100 received from the vehicle management server 200 through the communication unit 101 is also stored in the storage unit 102.

The sensor 103 is a device that performs sensing with respect to a surrounding state of the vehicle 100. Specifically, the sensor 103 includes a stereo camera, a laser scanner, LIDAR, a radar and the like. Information about the surrounding state of the vehicle 100 and may be an internal-combustion engine instead. Alternatively, the vehicle 100 may be a hybrid vehicle including both a motor and an internal-combustion engine as the engines.

The communication unit 101 connects the vehicle 100 to the network N1. In the present embodiment, communication with other devices such as the vehicle management server 200 may be performed through the network N1 by using a mobile communication service such as 3G or LTE. The vehicle 100 transmits position information of itself to the vehicle management server 200 through the communication unit 101 every predetermined period. As described later, the vehicle 100 receives, through the communication unit 101, a travel plan of the vehicle 100 created by the vehicle management server 200. The communication unit 101 may further include communication units for performing inter-vehicle communication with other vehicles. The storage unit 102 stores information, and is configured of a storage medium such as a magnetic disk or a flash memory. For example, map information is stored in the storage unit 102. The travel plan of the vehicle 100 received from the vehicle management server 200 through the communication unit 101 is also stored in the storage unit 102.

The sensor 103 is a device that performs sensing with respect to a surrounding state of the vehicle 100. Specifically, the sensor 103 includes a stereo camera, a laser scanner, LIDAR, a radar and the like. Information about the surrounding state of the vehicle 100 which are necessary for autonomous traveling of the vehicle 100. The environment detection unit 1051 may also perform tracking of a detected object. For example, a relative velocity of an object may be determined based on a difference between coordinates of the object detected in a preceding step and current coordinates of the object. Data about the environment (hereinafter referred to as "environmental data") detected by the environment detection unit 1051 is transmitted to the travel control unit 1052 described below.

The travel control unit 1052 controls traveling of the vehicle 100 based on the travel plan received from the vehicle management server 200 and stored in the storage unit 102, the position information of the vehicle 100 acquired by the position information acquisition unit 104, and the environmental data generated by the environment detection unit 1051. For example, the travel control unit 1052 causes the vehicle 100 to travel along a travel route included in the travel plan and according to a travel schedule included in the travel plan. In the case where the vehicle 100 is to travel on a road, the travel control unit 1052 selects the road travel mode as the travel mode. On the other hand, in the case where the vehicle 100 is to travel on a railway track, the travel control unit 1052 selects the track travel mode as the travel mode. When an object which the vehicle 100 will possibly collide into is detected by the environment detection unit 1051, the travel control unit 1052 performs collision avoidance control for causing the vehicle 100 to travel in such a way as to avoid collision into the object. Additionally, a known method may be adopted as a method of causing the vehicle 100 to perform autonomous traveling in the manner described above.

The sensor control unit 1053 controls operation and the like of the sensor 103. For example, the sensor control unit 1053 controls a sensing level, including a sensing range of the sensor 103. The damping control unit 1054 performs vibration damping control for suppressing vibration of the vehicle 100. Specifically, in the vibration damping control, damping force characteristics (damping coefficient) of a damper at the time of traveling of the vehicle 100 are adjusted by controlling a damper actuator provided for each wheel WH1, WH2 of the vehicle 100. For example, in the vibration damping control, when acceleration of in-use wheels, among the wheels WH1 and the wheels WH2, in a vertical direction, acceleration of the vehicle 100 in a transverse direction, or acceleration of the vehicle 100 in a front-back direction, detected by an accelerometer, not illustrated, exceeds a predetermined threshold, damping force characteristics (damping coefficient) of the damper for each in-use wheel are separately calculated, and the damper actuator (the first damper actuator 108, the second damper actuator 109 described later) provided for each in-use wheel is controlled according to the calculated damping force characteristics (damping coefficient). Vibration of the vehicle 100 (vibration of the body) is thereby damped. The "predetermined threshold" here is a value that is set in association with acceleration in each of the vertical direction, the transverse direction, and the front-back direction, and is a value that is changed according to target acceleration corresponding to each acceleration. For example, the predetermined threshold for each acceleration is set to a smaller value when the target acceleration corresponding to the acceleration is smaller than when the target acceleration is great. Additionally, a known method may be adopted as a method of calculating the damping force characteristics (damping coefficient) of the damper.

The drive unit 106 causes the vehicle 100 to travel, based on a command generated by the travel control unit 1052. For example, the drive unit 106 includes a motor as an engine, an inverter, a brake, and a steering mechanism and the like. As described above, the wheel switching actuators 107 are actuators for switching the in-use wheels according to the travel mode of the vehicle 100. The wheel switching actuators 107 switch the in-use wheels based on a command from the travel control unit 1052.

The first damper actuator 108 is a damper actuator provided for the road traveling wheel WH1, and the second damper actuator 109 is a damper actuator provided for the track traveling wheel WH2. Each damper actuator 108, 109 changes the damping force characteristics (damping coefficient) of the damper (not illustrated) attached to a suspension for each wheel WH1, WH2, and, for example, changes, continuously or stepwise, the damping force characteristics of the damper by changing a sectional area of a passage of a viscous fluid (such as oil) formed inside the damper. The damper actuator 108, 109 operates by power that is supplied by a battery (not illustrated) mounted in the vehicle 100. Additionally, the method of changing the damping force characteristics of the damper is not limited to the method described above, and other known methods may also be used.

Next, the vehicle management server 200 will be described. The vehicle management server 200 is a device that manages traveling of the vehicle 100. Specifically, the vehicle management server 200 creates a travel plan for the vehicle 100, and transmits the created travel plan to the vehicle 100. The vehicle management server 200 includes a communication unit 201 and a control unit 202. Like the communication unit 101 of the vehicle 100, the communication unit 201 is a communication interface for performing communication with the vehicle 100 and the like through the network. The vehicle management server 200 transmits a travel plan created by the control unit 202 to the vehicle 100 through the communication unit 201. The vehicle management server 200 receives an operation schedule of a train from the railway management server 400 through the communication unit 201.

Figure 5:
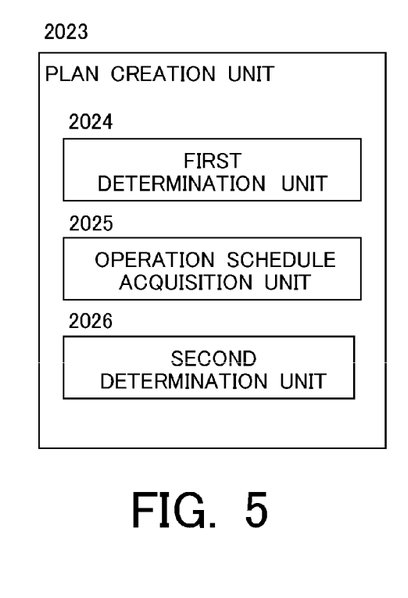
FIG. 5 is a block diagram schematically illustrating an example configuration of a plan creation unit of the vehicle management server.

The control unit 202 is in charge of controlling the vehicle management server 200. For example, the control unit 202 is configured as a microcomputer. As functional modules, the control unit 202 includes a position information management unit 2021, a map data management unit 2022, and a plan creation unit 2023. As illustrated in FIG. 5, the plan creation unit 2023 includes a first determination unit 2024, an operation schedule acquisition unit 2025, and a second determination unit 2026. Each functional module may be realized by execution, by a central processing unit (CPU; not illustrated), of a program stored in storage units (not illustrated), such as a read only memory (ROM), of the control unit 202. Apart or all of the functions may be realized by a hardware circuit such as an ASIC or an FPGA. The vehicle management server 200 does not have to be realized by one computer, and may alternatively be realized by cooperation between a plurality of computers.

The position information management unit 2021 manages position information of the vehicle 100 received through the communication unit 201. The map data management unit 2022 manages map data in which a travel route of the vehicle 100 is to be indicated. Specifically, the map data management unit 2022 stores map data in the storage units, and updates the stored map data as appropriate.

The plan creation unit 2023 creates a travel plan of the vehicle 100 including a travel route from a current position of the vehicle 100 to a destination of the vehicle 100, and a travel schedule for traveling along the travel route. As described above, the vehicle 100 is capable of traveling not only on roads, but also on railway tracks. Accordingly, the plan creation unit 2023 creates a travel plan based on roads and railway tracks in the map data.

(Travel Plan Creation Process)

Figure 6:
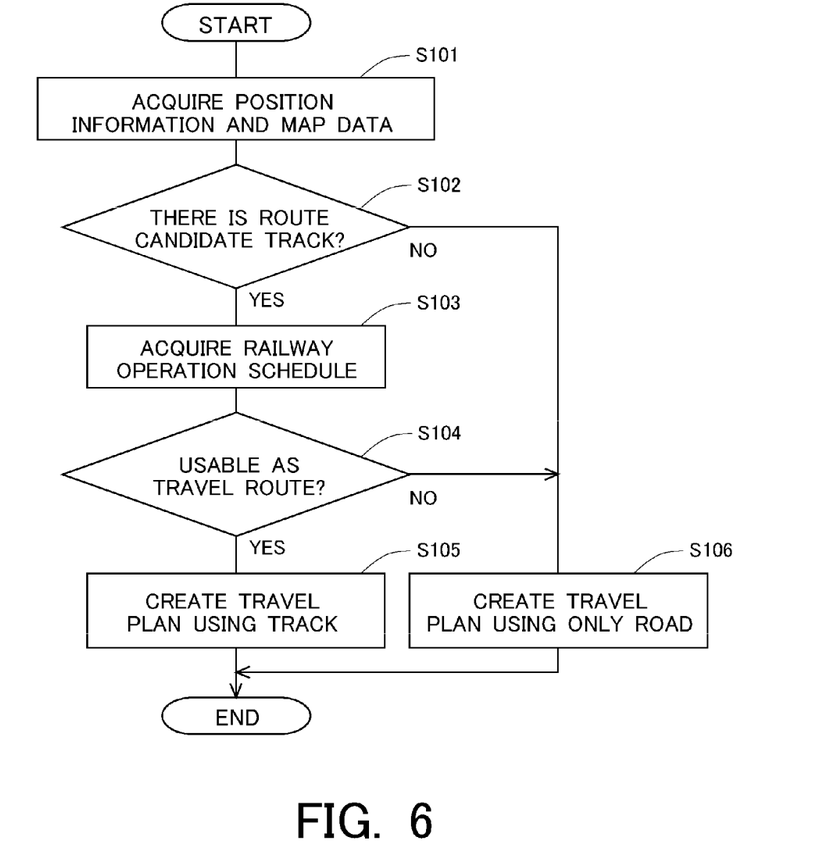
FIG. 6 is a flowchart illustrating a flow of a travel plan creation process.
Figure 7:
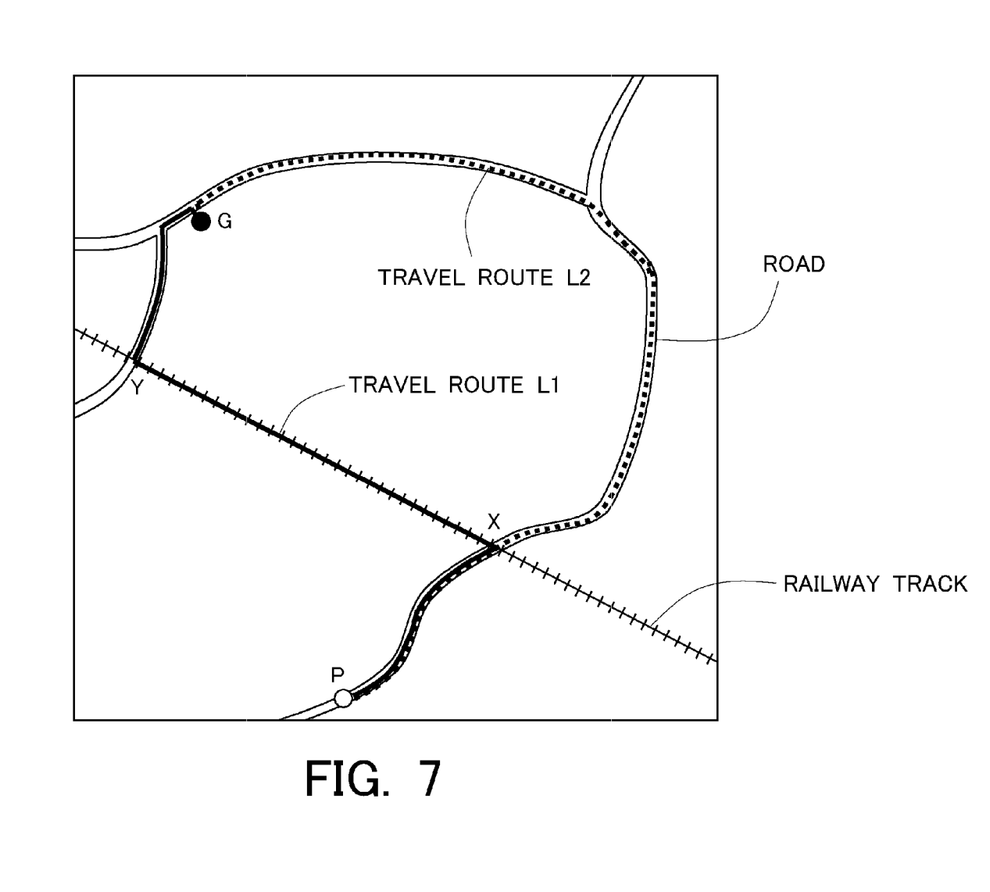
FIG. 7 is a diagram illustrating examples of a travel route of a vehicle, in map data, in a travel plan that is created by execution of the travel plan creation process illustrated in FIG. 6.

A travel plan creation process that is performed by the plan creation unit 2023 to create a travel plan of the vehicle 100 will be described with reference to FIGS. 6 and 7. FIG. 6 is flowchart illustrating a flow of the travel plan creation process. FIG. 7 is a diagram illustrating examples of a travel route of the vehicle, in map data, in a travel plan that is created by execution of the travel plan creation process illustrated in FIG. 6. In FIG. 7, P indicates a current position of the vehicle 100, and G indicates a destination of the vehicle 100. Furthermore, in FIG. 7, a travel route L1 indicated by a solid line, and a travel route L2 indicated by a dotted line indicate travel routes of the vehicle 100 from the current position to the destination. Each of the travel routes L1, L2 will be described later.

In the travel plan creation process illustrated in FIG. 6, first, in S101, position information of the vehicle 100 and map data are acquired. At this time, the position information of the vehicle 100 (i.e., a current position of the vehicle 100) is acquired from the position information management unit 2021. Furthermore, map data including the current position of the vehicle 100 and a destination of the vehicle 100 is acquired from the map data management unit 2022. Additionally, the destination of the vehicle 100 is set in advance by a user of the vehicle 100, and is stored in the storage units of the vehicle management server 200.

Next, in 3102, whether a route candidate track exists in the map data including the current position of the vehicle 100 and the destination of the vehicle 100 is determined. The route candidate track here is a railway track that the vehicle 100 may possibly travel on when the vehicle 100 is to reach the destination from the current position. For example, in the map data illustrated in FIG. 7, a part between X and Y (hereinafter also referred to as "X-Y track") of the railway track is present between the current position P of the vehicle 100 and the destination G of the vehicle 100. Accordingly, in S102, the X-Y track is recognized as the route candidate track. The process in S102 is performed by the first determination unit 2024.

In the case where negative determination is made in S102, or in other words, in the case where there is no route candidate track in the map data, a process in S106 is performed next. In S106, a travel plan that uses only roads is created. That is, a travel plan is created such that the vehicle 100 travels along a travel route formed only from roads, without including railway tracks. On the other hand, in the case where positive determination is made in S102, a process in S103 is performed next. In S103, a railway operation schedule for the route candidate track is acquired. For example, in the case of FIG. 7, the railway operation schedule for the X-Y track is acquired. Normally, trains travel on a railway track according to a railway operation plan (operation diagram). However, in actual operation, a deviation from the operation plan (delay or suspension with respect to the operation plan) may be caused due to an accident or weather, for example. Accordingly, in S103, in the case where the actual operation is deviated from the operation plan, a railway operation schedule for the route candidate track which takes the deviation into account, in addition to the railway operation plan, is acquired. The process in S103 is performed by the operation schedule acquisition unit 2025 communicating with the railway management server 400 through the communication unit 201.

Next, in S104, whether the route candidate track is usable as the travel route of the vehicle 100 is determined based on the railway operation schedule for the route candidate track acquired in S103. That is, whether, if the vehicle 100 traveled on the route candidate track, the vehicle 100 would obstruct operation of a train which is operated on the route candidate track is determined. For example, in the case of FIG. 7, an operation schedule of a train which is operated on the railway track including the X-Y track is acquired. The X-Y track may be determined as usable as the travel route of the vehicle 100, if it can be predicted based on the acquired operation schedule that a train will not travel on the X-Y track while the vehicle 100 is traveling on the X-Y track. Even if it is predicted that a train will travel on the X-Y track while the vehicle 100 is traveling on the X-Y track, if it is determined that an appropriate distance can be maintained between the vehicle 100 and the train, the X-Y track may be determined as usable as the travel route of the vehicle 100. The process in S104 is performed by the second determination unit 2026.

In the case where the route candidate track cannot be used as the travel route of the vehicle 100 because the vehicle 100 is predicted to obstruct operation of a train if the vehicle 100 traveled on the route candidate track, negative determination is made in S104. In this case, the process in S106 is performed, as in the case of negative determination in S102. That is, a travel plan is created such that the vehicle 100 travels along a travel route which is formed only from roads, without including the route candidate track. Accordingly, for example, in the case of FIG. 7, a travel plan is created such that the vehicle 100 travels along the travel route L2 not including the X-Y track. On the other hand, in the case where positive determination is made in S104, a process in S105 is performed next. In S105, a travel plan that uses the route candidate track is created. That is, a travel plan is created such that the vehicle 100 travels along a travel route including the route candidate track. Accordingly, for example, in the case of FIG. 7, a travel plan is created such that the vehicle 100 travels along the travel route L1 including the X-Y track. Then, the travel plan created by execution of the process in S105 or S106 is transmitted to the vehicle 100 through the communication unit 201.

With the travel plan creation process as described above, in a case where the vehicle 100 is able to travel along a railway track without obstructing operation of a train, a travel plan is created according to which the vehicle 100 travels along a travel route including the railway track.

Accordingly, a railway track may be effectively used as the travel route of the vehicle 100.

In the present embodiment, a case is described where the plan creation unit 2023 of the control unit 202 of the vehicle management server 200 creates the travel plan of the vehicle 100, but a configuration is also possible in which the vehicle 100 itself has a function corresponding to the plan creation unit 2023.

(Vehicle Control According to Travel Mode)

Next, control of the vehicle 100 according to a travel mode will be described. As described above, with the vehicle 100, the road travel mode is selected as the travel mode at the time of traveling or a road, and the track travel mode is selected as the travel mode at the time of traveling on a railway track. Such selection of the travel mode is performed by the travel control unit 1052 of the control unit 105 of the vehicle 100. In the case of switching the travel mode, the travel control unit 1052 performs switching of the in-use wheels by transmitting a wheel switching command to the wheel switching actuators 107.

When the road travel mode is selected as the travel mode of the vehicle 100, and the road traveling wheels WH1 are to be used as the in-use wheels, the first damper actuators 108 are caused to operate. On the other hand, when the track travel mode is selected as the travel mode of the vehicle 100, and the track traveling wheels WH2 are to be used as the in-use wheels, the second damper actuators 109 are caused to operate. The damping control unit 1054 performs vibration damping control by controlling the damper actuators, among the first damper actuators 10S and the second damper actuators 109, operating according to the travel mode of the vehicle 100.

At this time, in the vibration damping control, the damping control unit 1054 changes a control cycle between when the first damper actuators 108 are controlled in the road travel mode and when the second damper actuators 109 are controlled in the track travel mode. More specifically, when the second damper actuators 109 are controlled in the track travel mode, the damping control unit 1054 increases a control cycle (i.e., adjustment cycle for damping force characteristics of damper) in the vibration damping control compared to when the first damper actuators 108 are controlled in the road travel mode. This is because, generally, a surface of a railway track is flatter than a surface of a road, and the vehicle 100 is less easily vibrated when the vehicle 100 is traveling on a railway track than when the vehicle 100 is traveling on a road. That is, in the case of controlling the second damper actuators 109 in the track travel mode, the damping properties of the vehicle 100 are considered to be maintained at an appropriate level even if the control cycle of the vibration damping control is made longer than when the first damper actuators 108 are controlled in the road travel mode. In this manner, due to the damping control unit 1054 changing the control cycle of the vibration damping control according to the travel mode (that is, according to the in-use wheels and the operated damper actuators), the second damper actuators 109 may be prevented from operating unnecessarily in the track travel mode. That is, an operation frequency of the second damper actuators 109 may be suppressed as much as possible.

In the present embodiment, the vibration damping control is realized by controlling the first damper actuators 108 and the second damper actuators 109, but the method of realizing the vibration damping control is not limited thereto. That is, the vibration damping control may be realized by controlling a vibration damping mechanism other than the damper actuator of the vehicle 100 (such as an air spring attached to a suspension, a stabilizer, or the like). Also in such a case, as described above, unnecessary operation of the vibration damping mechanism may be suppressed by changing the control cycle of the vibration damping control according to the travel mode of the vehicle 100.

As described above, collision avoidance control is performed by the travel control unit 1052 of the vehicle 100. The collision avoidance control is performed when an object that the vehicle 100 may possibly collide into is detected by the environment detection unit 1051. The environment detection unit 1051 detects the object based on data acquired by the sensor 103. The sensing level of the sensor 103 is controlled by the sensor control unit 1053 of the vehicle 100.

The sensor control unit 1053 changes the sensing level of the sensor 103 according to the travel mode of the vehicle 100. More specifically, when the travel mode is the track travel mode, the sensor control unit 1053 reduces the sensing level of the sensor 103 in the transverse direction of the vehicle 100 compared to when the travel mode is the road travel mode. This is because, when the vehicle 100 is traveling on a railway track, no pedestrians walk near the vehicle 100 and no vehicles, and the like travel on an adjacent lane, and an object is less likely to suddenly run in front of the vehicle 100 from the transverse direction compared to a case of the vehicle 100 traveling on a road. That is, basically, in the case where the vehicle 100 is traveling on a railway track, if sensing is performed by the sensor 103 with respect to states in front and behind the vehicle 100, an object that the vehicle 100 may possibly collide Into may be detected. Accordingly, when the travel mode is the track travel mode, even if the sensing level of the sensor 103 for the transverse direction of the vehicle 100 is reduced compared to when the travel mode is the road travel mode, the collision avoidance control is assumed to be appropriately performed. In this manner, by changing the sensing level of the sensor 103 according to the travel mode, the sensor 103 may be prevented from performing unnecessary sensing in the track travel mode.

Changing of the sensing level of the sensor 103 according to the travel mode of the vehicle 100 is not limited to be performed with respect to the sensing level for the transverse direction of the vehicle 100. For example, the sensing level for the front-back direction of the vehicle 100 may be changed according to the travel mode of the vehicle 100.

Figure 8:
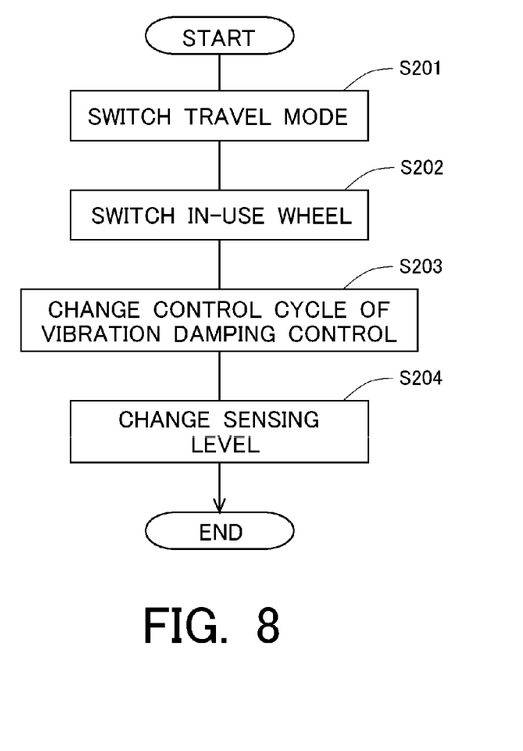
FIG. 8 is a flowchart illustrating a control flow for travel mode switching of a vehicle.

A control flow for switching of the travel mode of the vehicle 100 will be described with reference to the flowchart illustrated in FIG. 8. The present flow is performed at a timing when the vehicle 100 traveling on a road enters a railway track, or at a timing when the vehicle 100 traveling on a railway track enters a road.

In the present flow, first, in S201, the travel control unit 1052 switches the travel mode of the vehicle 100. That is, when the vehicle 100 traveling on a road enters a railway track, the travel mode is switched from the road travel mode to the track travel node. When the vehicle 100 traveling on a railway track enters a road, the travel mode is switched from the track travel mode to the road travel mode. Next, in S202, the wheel switching actuators 107 switch the in-use wheels by receiving a command from the travel control unit 1052.

Next, in S203, the damping control unit 1054 changes the control cycle of the vibration damping control according to switching of the travel mode in S201. Next, in S204, the sensor control unit 1053 changes the sensing level of the sensor 103 according to switching of the travel mode in S201. The control cycle of the vibration damping control and the sensing level of the sensor 103 corresponding to each travel mode may be determined in advance based on experiments or the like. At the timing of switching of the travel mode, the vehicle 100 may receive from the vehicle management server 200, through the communication unit 101, data about the control cycle of the vibration damping control and the sensing level of the sensor 103 corresponding to each travel mode.

By suppressing an operation frequency of the second damper actuators 109 or suppressing unnecessary sensing by the sensor 103 by vehicle control according to the travel mode as described above, the amount of power supplied to these devices from a battery (not illustrated) may be suppressed. As a result, electric consumption of the vehicle 100 may be suppressed.

<First Modification>

In the present modification, the vehicle 100 is a vehicle which is used for public transport or a rideshare vehicle. In this case, the vehicle 100 is used as a transport by a large number of people when the vehicle 100 is traveling along a travel route included in a travel plan created by the plan creation, unit 2023 of the control unit 202 of the vehicle management server 200.

Accordingly, in the present modification, in the case where the vehicle 100 is to travel along a travel route including a route candidate track, according to a travel plan created by the plan creation unit 2023, the vehicle management server 200 distributes, over the network through the communication unit 201, a travel schedule of the vehicle 100 on a railway track which is made the route candidate track. For example, in the case where the vehicle 100 is to travel along the travel route L1 illustrated in FIG. 7, a travel schedule for when the vehicle 100 travels on the X-Y track is distributed over the network. The travel schedule of the vehicle 100 that is distributed at this time may include arrival time and the like of the vehicle at each station on the railway track as the route candidate track. At this time, the travel schedule of the vehicle 100 may be published on a specific website. The travel schedule of the vehicle 100 may be transmitted to terminals having a specific application. This allows railway users to grasp the travel schedule of the vehicle 100. Railway users may thereby use, instead of a train, the vehicle 100 traveling on the railway track as transport means.

<Second Modification>

In the embodiment described above, the vehicle 100 is an autonomous vehicle, but an application target of the present disclosure is not limited to the autonomous vehicle. That is, even if a vehicle is driven by manual operation of a driver, the vehicle may be taken as an application target of the present disclosure as long as it is a vehicle having a configuration capable of traveling on a road and a railway track. In this case, for example, a travel plan of the vehicle created in the same manner as in the embodiment described above is provided to a navigation system installed in the vehicle. The driver of the vehicle may thereby cause the vehicle to travel using a railway track. Accordingly, a vehicle which is driven by manual operation of a driver may also effectively use a railway track as the travel route of the vehicle.

What is claimed is:

1. A management system that manages a travel plan of a vehicle, the management system comprising a controller comprising at least one processor configured to create the travel plan of the vehicle, wherein
the controller
determines, based on map data including a current position of the vehicle and a destination of the vehicle, whether there is a route candidate track that is a railway track and a road that is possibly used as a travel route of the vehicle, the vehicle is capable of traveling on the road and on the railway track,
acquires a railway operation schedule for the route candidate track, in a case where presence of the route candidate track is determined, and
determines whether the route candidate track can be used as the travel route of the vehicle, based on the railway operation schedule for the route candidate track acquired, and
in a case where the route candidate track is determined as usable as the travel route of the vehicle, a travel plan is created such that the vehicle travels along the travel route including the route candidate track.

2. The management system according to claim 1, further comprising distributor that distributes, over a network, a travel schedule of the vehicle on the railway track that is made the route candidate track, in a case where the vehicle is to travel along the travel route including the route candidate track according to the travel plan created by the controller.

3. A control system that controls a vehicle that is a management target of the management system according to claim 1, the control system comprising travel controller that causes the vehicle to perform autonomous traveling according to the travel plan of the vehicle created by the controller.

4. A control system that controls a vehicle that is a management target of the management system according to claim 1, the control system comprising mode controller that places a control mode of a predetermined device in a road travel mode, when the vehicle is to travel on a road, and in a track travel mode, when the vehicle is to travel on a railway track, where the predetermined device is provided in the vehicle and is used to control a traveling state of the vehicle.

5. The control system according to claim 4, wherein
the predetermined device is a vibration damping mechanism that damps vibration of the vehicle,
the mode controller is damping controller that performs vibration damping control by controlling the vibration damping mechanism, and
a control cycle of the vibration damping control is different between the road travel mode and the track travel mode.

6. The control system according to claim 4, further comprising travel controller that performs collision avoidance control for avoiding collision between the vehicle and an object, based on a sensing result of a sensor that performs sensing with respect to a surrounding state of the vehicle, wherein
the predetermined device is the sensor,
the mode controller is sensor controller that controls the sensor, and
a sensing level of the sensor is different between the road travel mode and the track travel mode.

7. A management method of managing a travel plan of a vehicle, the management method comprising the steps of:
determining, based on map data including a current position of the vehicle and a destination of the vehicle, whether there is a route candidate track that is a railway track and a road that is possibly used as a travel route of the vehicle, the vehicle is capable of traveling on the road and on the railway track;
acquiring a railway operation schedule for the route candidate track, in a case where presence of the route candidate track is determined;

determining whether the route candidate track is usable as the travel route of the vehicle, based on the railway operation schedule for the route candidate track; and creating a travel plan according to which the vehicle travels along the travel route of the vehicle including the route candidate track, in a case where the route candidate track is determined as usable as the travel route of the vehicle.

8. A program for causing a computer to perform a management method of managing a travel plan of a vehicle, a non-transitory computer usable medium having computer readable instructions embodied therein, the computer readable instructions, when executed by a processor, cause the processor to perform a management method, the management method comprising the steps of:

determining, based on map data including a current position of the vehicle and a destination of the vehicle, whether there is a route candidate track that is a railway track and a road that is possibly used as a travel route of the vehicle, the vehicle is capable of traveling on the road and on the railway track;

acquiring a railway operation schedule for the route candidate track, in a case where presence of the route candidate track is determined;

determining whether the route candidate track is usable as the travel route of the vehicle, based on the railway operation schedule for the route candidate track; and creating a travel plan according to which the vehicle travels along the travel route of the vehicle including the route candidate track, in a case where the route candidate track is determined as usable as the travel route of the vehicle.

* * * * *